US012767251B2

(12) United States Patent
Narayanaswamy

(10) Patent No.: US 12,767,251 B2
(45) Date of Patent: Oct. 20, 2026

(54) RETROFITTABLE TRACK LINK FOR ENDLESS CRAWLER TRACKS OF WORK MACHINES

(71) Applicant: Caterpillar Inc., Peoria, IL (US)

(72) Inventor: Santhanam Narayanaswamy, Chennai (IN)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 18/598,816

(22) Filed: Mar. 7, 2024

(65) Prior Publication Data

US 2024/0336311 A1 Oct. 10, 2024

(30) Foreign Application Priority Data

Apr. 4, 2023 (IN) .............................. 202311025529

(51) Int. Cl.
*B62D 55/21* (2006.01)

(52) U.S. Cl.
CPC .................................... *B62D 55/21* (2013.01)

(58) Field of Classification Search
CPC ...... B62D 55/20; B62D 55/21; B62D 55/213; B62D 55/32
See application file for complete search history.

(56) References Cited

U.S. PATENT DOCUMENTS 4,050,750 A * 9/1977 Yoshihashi .......... B62D 55/213 305/202
4,365,848 A * 12/1982 Grilli ................... B62D 55/213 305/202
4,457,565 A * 7/1984 Bissi .................... B62D 55/213 305/202
4,636,014 A * 1/1987 Dennison ............. B62D 55/213 305/202
4,645,274 A * 2/1987 Wohlford ............. B62D 55/215 305/43
5,172,965 A 12/1992 Taft
6,783,196 B2 8/2004 Maguire et al.
(Continued)

FOREIGN PATENT DOCUMENTS

KR 20080068586 A 7/2008
WO 2012003200 A1 1/2012
WO 2014033971 A1 3/2014

OTHER PUBLICATIONS

First Examination Report for Indian Patent Application No. 202311025529, mailed Jun. 8, 2026 (6 pgs).

*Primary Examiner* — Tyler J Lee

(57) ABSTRACT

A retrofittable track link, for an endless crawler track, includes a body defining a first side, a second side, a leading strap end, a trailing strap end, an intermediate portion extending between the leading and trailing strap ends and defining a linear profile, a first surface at the leading strap end towards the first side, and a second surface at the trailing strap end towards the second side. The first surface and the second surface are tapered relative to the linear profile to be indented into the body. The first surface is mated with a trailing strap end of a succeeding track link at a first overlapping portion of the retrofittable track link with the succeeding track link. The second surface is mated with a leading strap end of a preceding track link at a second overlapping portion of the retrofittable track link with the preceding track link.

11 Claims, 6 Drawing Sheets

(56) References Cited

U.S. PATENT DOCUMENTS

| | | | | |
|---|---|---|---|---|
| 7,877,977 | B2 * | 2/2011 | Johannsen | B62D 55/213 59/35.1 |
| 8,413,747 | B2 * | 4/2013 | Beard | B62D 55/202 180/9 |
| 9,221,505 | B1 * | 12/2015 | Gonzalez | B62D 55/305 |
| 9,333,998 | B2 * | 5/2016 | Thorson | B62D 55/08 |
| 9,359,023 | B2 | 6/2016 | Kaufmann et al. | |
| 9,796,436 | B2 | 10/2017 | Johannsen et al. | |
| 9,926,024 | B2 * | 3/2018 | Clarke | B62D 55/28 |
| 2002/0021047 | A1 * | 2/2002 | Durick | B62D 55/20 305/201 |
| 2008/0174175 | A1 * | 7/2008 | Livesay | B62D 55/213 305/186 |
| 2011/0316331 | A1 * | 12/2011 | Clarke | B62D 55/28 305/186 |
| 2012/0153715 | A1 | 6/2012 | Tsubaki et al. | |
| 2014/0001831 | A1 * | 1/2014 | Thorson | B62D 55/28 305/202 |
| 2016/0176456 | A1 * | 6/2016 | Oertley | B62D 55/211 305/186 |
| 2016/0236736 | A1 * | 8/2016 | Thorson | B62D 55/26 |
| 2021/0101651 | A1 | 4/2021 | Rathod et al. | |

* cited by examiner

RETROFITTABLE TRACK LINK FOR ENDLESS CRAWLER TRACKS OF WORK MACHINES

CROSS-REFERENCE TO RELATED APPLICATION

This application claims priority under 35 USC § 119 and the Paris Convention to Indian Patent Application 202311025529 filed on Apr. 4, 2023.

TECHNICAL FIELD

The present disclosure relates to retrofittable track links for endless crawler tracks of work machines. More particularly, the present disclosure relates to a track link having tapered surfaces for retrofitting the track link to an existing endless crawler track of a machine.

BACKGROUND

Work machines, for example, excavators, loaders, and the likes, are equipped with endless crawler tracks that facilitate movement of the machines over ground surfaces. An endless crawler track typically includes a pair of track chain, each track chain formed of track links serially arranged one after the other and pivotally connected to each other via bushing and track pin arrangements. These track links often wear over time, at different rates, and may need to be replaced and/or serviced. As such, costs of production and maintenance of these track links are important considerations in the manufacture and assembly of the track chains.

U.S. Pat. No. 9,796,436 B2 discloses a track link for a track assembly of a machine. The track link includes an inner surface and an outer surface disposed opposite the inner surface. The inner surface and the outer surface extend from adjacent a first end to adjacent a second end. The track link further includes a shoe face and a rail disposed opposite to the shoe face. The shoe face and the rail extends between the inner surface and the outer surface. Furthermore, the track link includes a leading end adjacent the first end and a trailing end adjacent the second end. The rail includes a middle section, a first outer section, and a second outer section offset relative to the first outer section.

SUMMARY OF THE INVENTION

In one aspect, the disclosure relates to a retrofittable track link for an endless crawler track. The retrofittable track link includes a body. The body defines a first side and a second side opposite to the first side. Also, the body defines a leading strap end, a trailing strap end, and an intermediate portion extending therebetween and defining a linear profile. Further, the body defines a first surface at the leading strap end and a second surface at the trailing strap end. The first surface is disposed at the first side and the second surface is disposed at the second side. Also, the first surface and the second surface are tapered with respect to the linear profile to be indented into the body. The first surface is configured to be mated with a trailing strap end of a succeeding track link of the endless crawler track at a first overlapping portion of the retrofittable track link with the succeeding track link. The second surface is configured to be mated with a leading strap end of a preceding track link of the endless crawler track at a second overlapping portion of the retrofittable track link with the preceding track link.

In another aspect, the disclosure is directed to an endless crawler track. The endless crawler track includes a first track chain and a second track chain. Each of the first track chain and the second track chain includes a plurality of track links serially arranged one after the other such that a leading strap end of a preceding track link overlaps a trailing strap end of a succeeding track link to define a plurality of overlapping portions in a corresponding track chain. Also, the endless crawler track includes a plurality of pins correspondingly passing through the plurality of overlapping portions of each of the first track chain and the second track chain to rotatably and correspondingly couple the plurality of pins with each of the first track chain and the second track chain. At least one track link of the plurality of track links includes a retrofittable track link. The retrofittable track link includes a body. The body defines a first side and a second side opposite to the first side. Also, the body defines a leading strap end, a trailing strap end, and an intermediate portion extending therebetween and defining a linear profile. Further, the body defines a first surface at the leading strap end and a second surface at the trailing strap end. The first surface is disposed at the first side and the second surface is disposed at the second side. Also, the first surface and the second surface are tapered with respect to the linear profile to be indented into the body. The first surface is configured to be mated with a trailing strap end of a succeeding track link of the endless crawler track at a first overlapping portion of the retrofittable track link with the succeeding track link. The second surface is configured to be mated with a leading strap end of a preceding track link of the endless crawler track at a second overlapping portion of the retrofittable track link with the preceding track link.

In yet another aspect, the disclosure is related to a method of manufacturing a retrofittable track link for an endless crawler track. The method includes providing a body defining a first side and a second side opposite to the first side. Further, the method includes machining the first side to define a first surface indented into the body to form a leading strap end of the body. Also, the method includes machining the second side to define a second surface indented into the body to form a trailing strap end of the body and an intermediate portion extending between the leading strap end and the trailing strap end. The intermediate portion defines a linear profile. The first side being machined at a first angle with respect to the linear profile to define the first surface and the second side being machined at a second angle with respect to the linear profile to define the second surface. The first surface is configured to be mated with a trailing strap end of a succeeding track link of the endless crawler track at a first overlapping portion of the retrofittable track link with the succeeding track link. The second surface is configured to be mated with a leading strap end of a preceding track link of the endless crawler track at a second overlapping portion of the retrofittable track link with the preceding track link.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

The term "about" used in conjunction with a numerical value or range modifies that value or range by extending the boundaries above and below the numerical values set forth. In general, the term "about" is used herein to modify a numerical value above and below the stated value by 10%.

Figure 1:
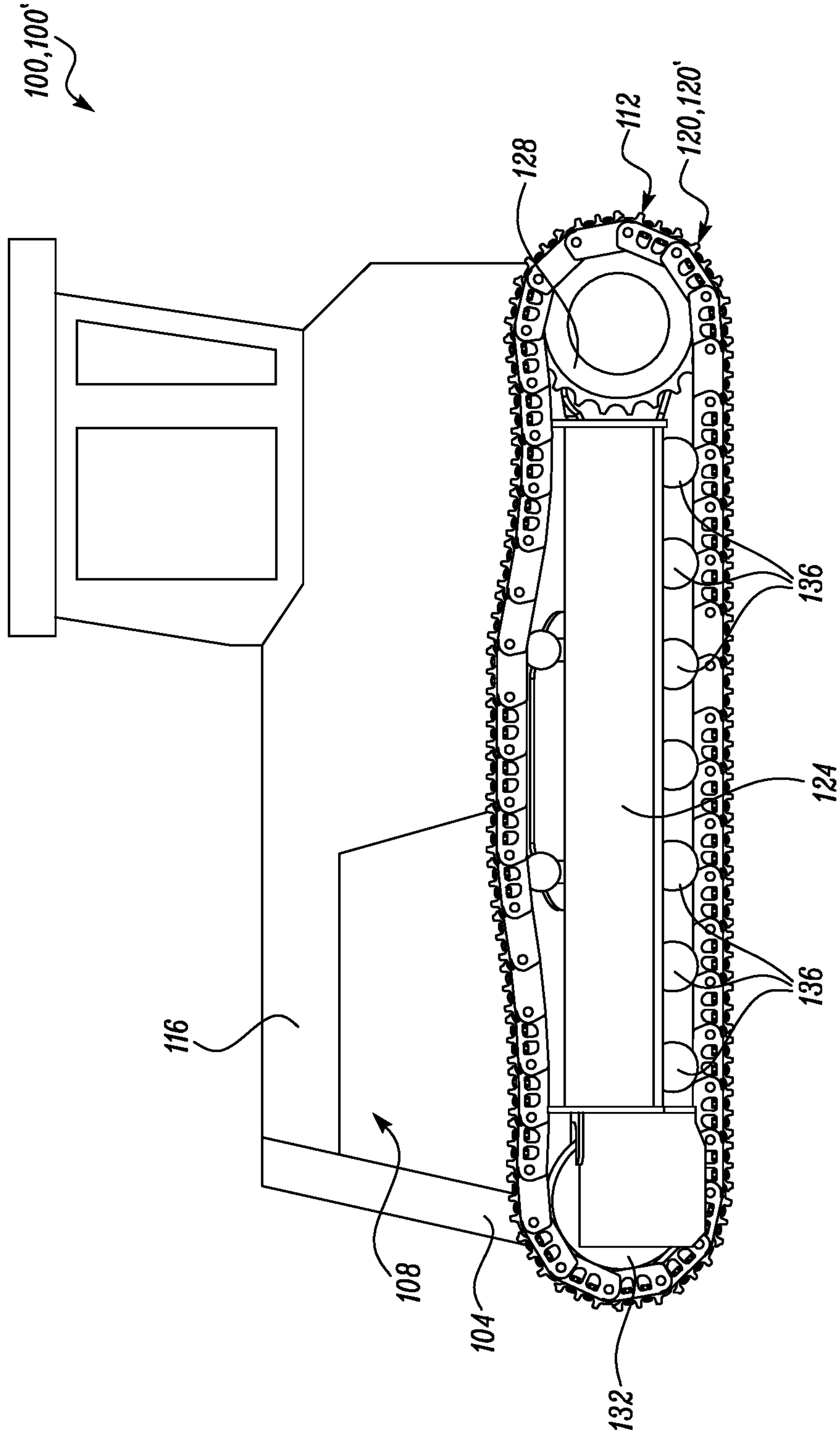
FIG. 1 illustrates an exemplary work machine having an endless crawler track, in accordance with an embodiment of the present disclosure.

Referring to FIG. 1, an exemplary work machine 100 (hereinafter referred to as 'machine 100') is shown. The machine 100 may embody a mobile machine 100' that performs one or more operations associated with an industry such as mining, construction, farming, transportation, or any other industry known in the art. For example, the machine 100 can be an excavator, a dozer, a loader, a backhoe, a motor grader, or any other mobile machine configured to perform earth moving operations.

The machine 100 may include various systems and/or assemblies that cooperate to perform operations. For example, as shown in FIG. 1, the machine 100 includes frame 104, a propulsion system 108, and an undercarriage assembly 112. The frame 104 may accommodate and support the propulsion system 108, although other known systems and/or components may be supported by the frame 104, as well. The propulsion system 108 may include a power compartment 116 and a power source (not shown) housed within the power compartment 116. The power source may include a combustion engine, an electrical power source, or a combination of both. The power source may be configured to generate an output power required to operate various systems or assemblies, such as the undercarriage assembly 112 of the machine 100.

The undercarriage assembly 112 is configured to support and propel the frame 104 (or the machine 100), for example, from one location to another location. The undercarriage assembly 112 may include one or more endless crawler tracks 120, on either side of the machine 100 (only one endless crawler track 120' is shown in FIG. 1). In addition, the undercarriage assembly 112 may include a track roller frame 124 and a plurality of rotatable track-engaging elements, namely one or more drive sprockets 128, one or more idlers 132, and a plurality of rollers 136. In an example, as shown in FIG. 1, the endless crawler track 120' extends about the plurality of rotatable track-engaging elements in a generally conventional manner. In the present embodiment, the machine 100 is shown with the undercarriage assembly 112 in a so-called "oval track" configuration, however, it should be appreciated that a "high drive" configuration, or still another configuration of the undercarriage assembly 112 might be employed in other embodiments.

Figure 2:
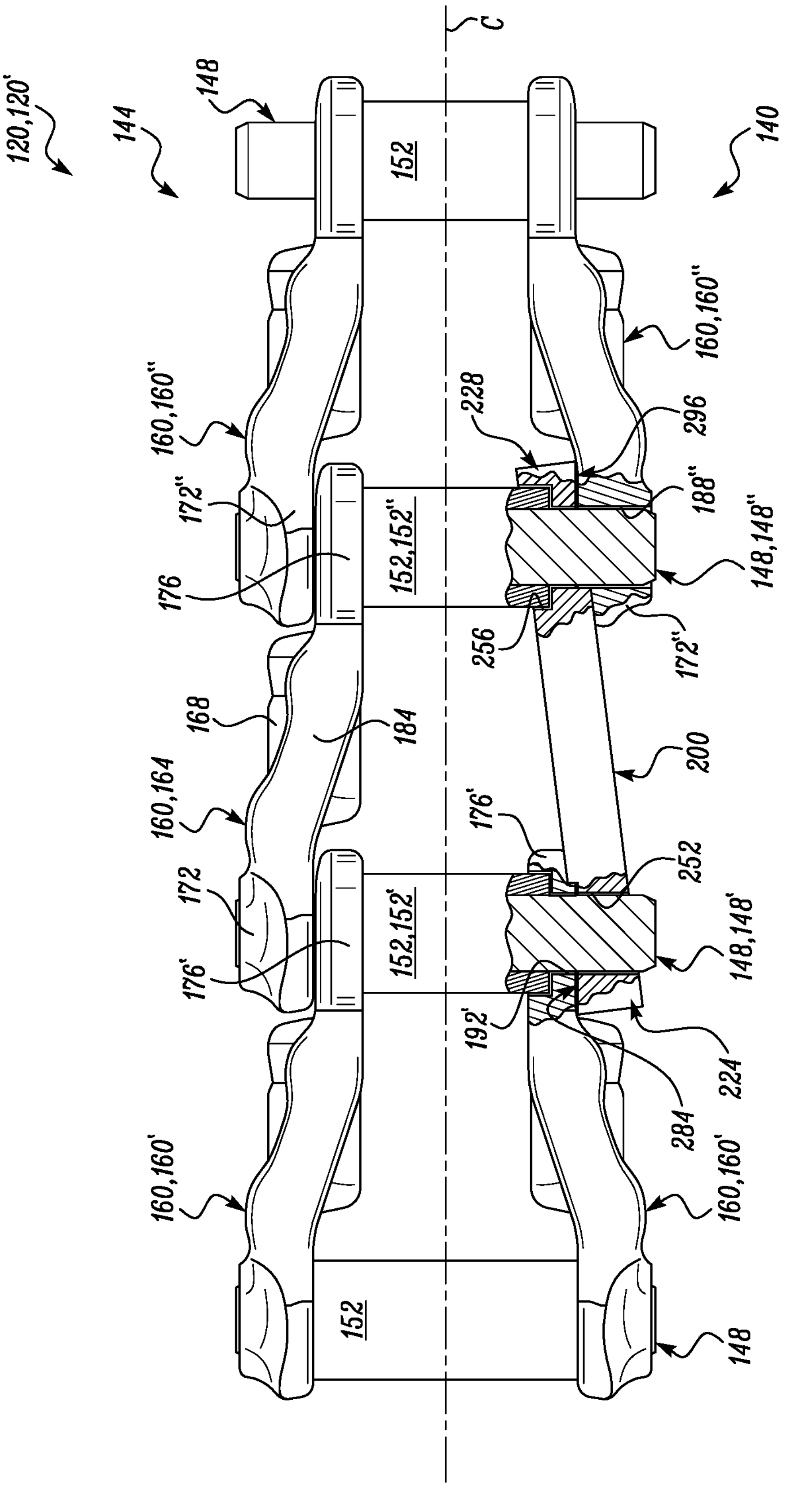
FIG. 2 illustrates an elevational view of a portion of the endless crawler track having a retrofittable track link retrofitted to at least one track chain of the endless crawler track, in accordance with an embodiment of the present disclosure.

Referring to FIG. 2, the endless crawler track 120' is discussed. The endless crawler track 120' includes a first track chain 140, a second track chain 144, a plurality of pins 148, a plurality of bushings 152, and a plurality of track shoes 156 (shown in FIG. 5). Each of the first track chain 140 and the second track chain 144 is formed of a plurality of track links 160. An exemplary track link 164 of the plurality of track links 160 (corresponding to the second track chain 144) will now be discussed, and the description herein of the exemplary track link 164 should be understood to refer to any of the plurality of track links 160 of both the first track chain 140 and the second track chain 144, except where otherwise indicated or apparent from the context.

The track link 164 includes an elongated link body 168 defining a leading strap end 172 and a trailing strap end 176. The trailing strap end 176 is laterally offset from the leading strap end 172 to impart a substantially S-shaped (or a Z-shaped) profile to the track link 164. Further, the track link 164 includes a shoe-mounting surface 180 (shown in FIG. 5) configured to mount the corresponding track shoe 156, and a rail surface 184 opposite to the shoe-mounting surface 180 and configured to engage with the rollers 136 (or the idlers 132) during the operation of the machine 100, a first track pin bore 188 defined at the leading strap end 172, and a second track pin bore 192 defined at the trailing strap end 176.

In an assembly of the track link 164 with a succeeding track link 160' and a preceding track link 160", the track link 164, the succeeding track link 160', and the preceding track link 160" are serially arranged one after the other such that the leading strap end 172 of the track link 164 overlaps with a trailing strap end 176' of the succeeding track link and the trailing strap end 176 of the track link 164 overlaps with a leading strap end 172" of the preceding track link 160". Subsequently, a pin 148' (with a bushing 152) is passed through the first track pin bore 188 of the track link 164 and a second track pin bore 192' of the succeeding track link 160', and a pin 148" (with a bushing 152") is passed through the second track pin bore 192 of the track link 164 and a first track pin bore 188' of the preceding track link 160", to couple the track link 164 with the succeeding track link 160' and the preceding track link 160" and form the second track chain 144, and hence, the endless crawler track 120.

Operations of the machine 100 inevitably results in wear or damage to various components of the endless crawler track 120, particularly to the track links 160. For example, as the endless crawler track 120 operates, the rail surface 184 of the track link 160 may wear away through contact with the idlers 132 (or the rollers 136) of the undercarriage assembly 112, and/or outside materials (e.g., the ground). These track links 160 are expensive and difficult to manufacture due to their complex geometric features formed using expensive processes, such as forging. Therefore, replacement of such worn or damaged track link 160 with a new track link 160 (having similar complex geometry) is an expensive affair. In this regard, a low-cost retrofittable track link 200, in one or more aspects of the present disclosure, is disclosed.

Figure 3:
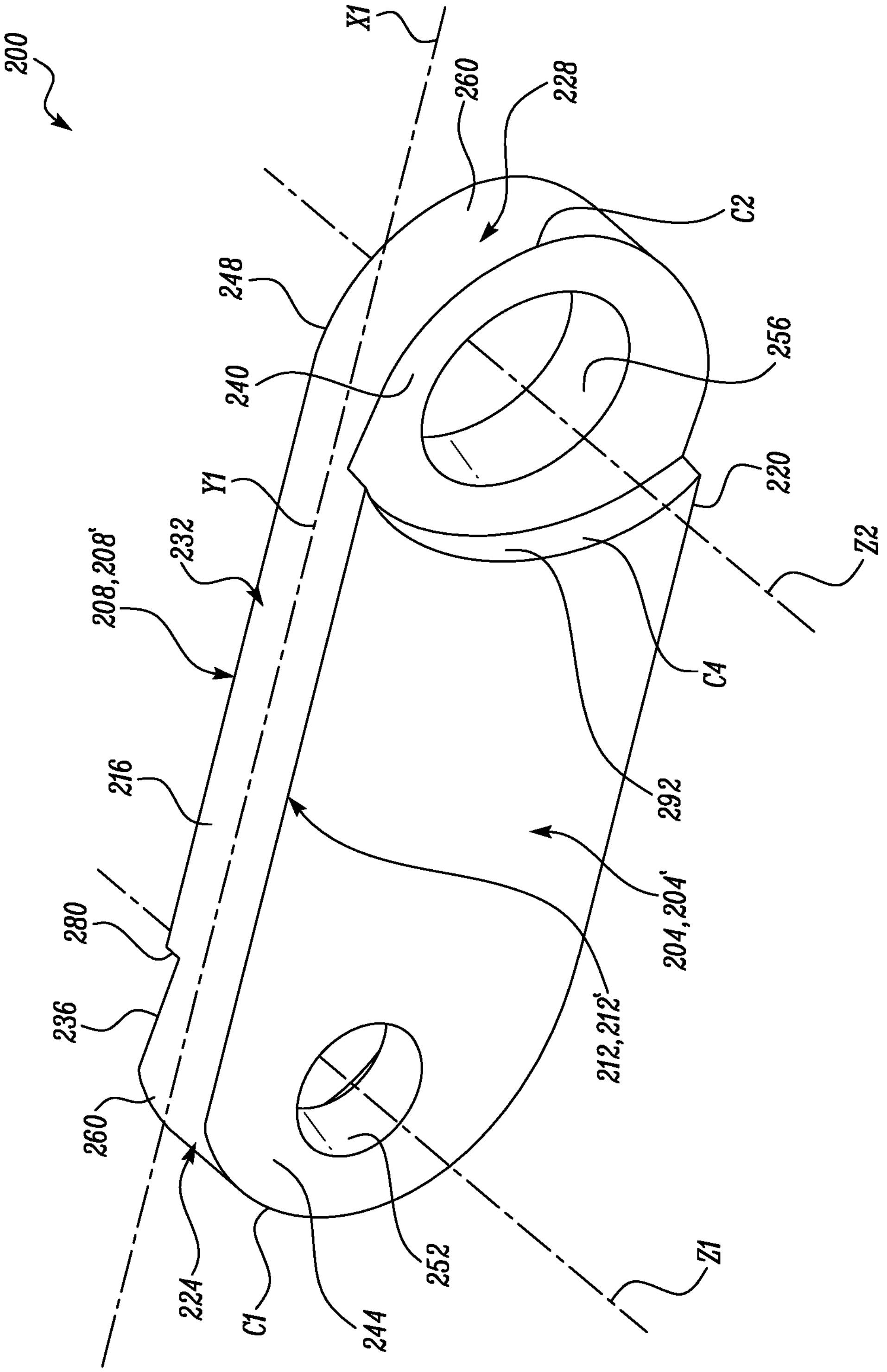
FIG. 3 is a perspective view of the retrofittable track link, in accordance with an embodiment of the present disclosure.
Figure 4:
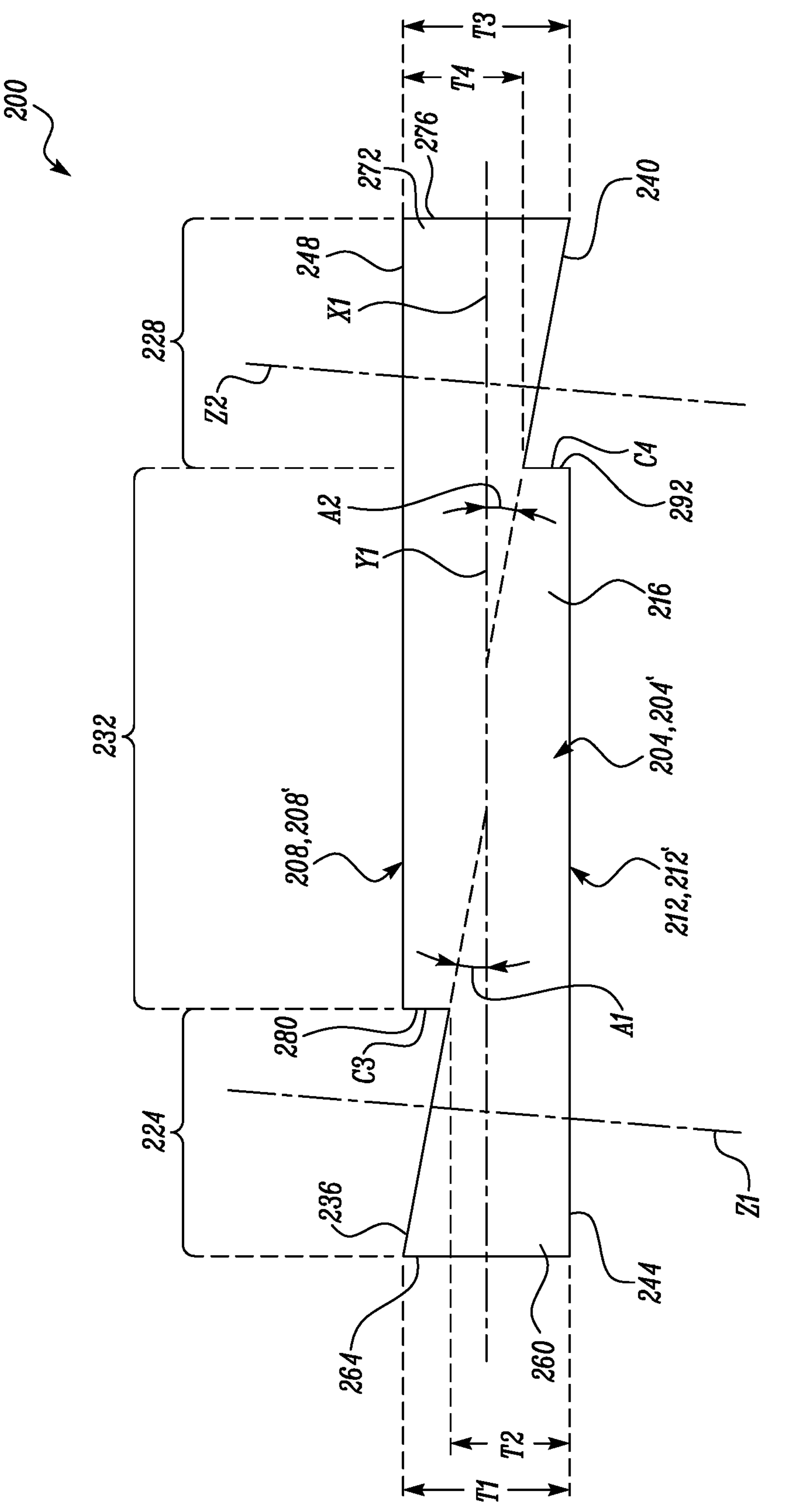
FIG. 4 is an elevational view of the retrofittable track link, in accordance with an embodiment of the present disclosure.

Referring to FIGS. 3 and 4, the retrofittable track link 200 includes a body 204. The body 204 may be a single, monolithic body 204 defining a linear longitudinal axis 'X1'. The body 204 may be fabricated of a ferrous metal, such as steel or iron. The body 204 defines a first side 208 and a second side 212 laterally opposite to the first side 208. As shown in FIG. 2, the first side 208 is an inboard link side 208', and the second side 212 is an outboard link side 212'. It should be noted that the term "inboard" is taken to mean toward a longitudinal centerline 'C' of the endless crawler track 120', whereas the term "outboard" is taken to mean away from the longitudinal centerline 'C' of the endless crawler track 120.

The body 204 defines an upper rail surface 216, a lower shoe-mounting surface 220, a leading strap end 224, a trailing strap end 228, and an intermediate portion 232. Also, the body 204 defines a first surface 236, a second surface 240, a third surface 244, and a fourth surface 248. In addition, the body 204 defines a leading track pin bore 252 and a trailing track pin bore 256. Each of the above-mentioned features of the body 204 of the retrofittable track link 200 is now discussed.

The upper rail surface 216 and the lower shoe-mounting surface 220 are disposed opposite to one another. The upper rail surface 216 may be configured to contact with multiple components of the undercarriage assembly 112, such as the idlers 132, the rollers 136, etc. The lower shoe-mounting surface 220 may be configured to mount track shoes (e.g., the track shoe 156) to the body 204.

The leading strap end 224 and the trailing strap end 228 are offset from one another along the linear longitudinal axis 'X1' of the body 204. The leading strap end 224 defines a first arcuate surface 260 that extends between the upper rail surface 216 and the lower shoe-mounting surface 220. The first arcuate surface 260 may have a concavity 'C1' that faces towards the trailing strap end 228, and a leading apex 264 (shown in FIG. 4). The first arcuate surface 260 may have a radius in a range of about 50-80 millimeters. Similarly, the trailing strap end 228 defines a second arcuate surface 272 that extends between the upper rail surface 216 and the lower shoe-mounting surface 220. The second arcuate surface 272 may have a concavity 'C2' that faces towards the leading strap end 224, and a trailing apex 276 (shown in FIG. 4). The second arcuate surface 272 may have a radius in a range of about 50-80 millimeters.

The intermediate portion 232 extends longitudinally along the linear longitudinal axis 'X1' between the leading strap end 224 and the trailing strap end 228, and laterally between the first side 208 and the second side 212 of the body 204. The intermediate portion 232 includes a linear profile defining a linear axis 'Y1' extending parallel to the linear longitudinal axis 'X1' of the body 204. In the present embodiment, as shown in FIG. 4, the linear axis 'Y1' of the intermediate portion 232 coincides with the linear longitudinal axis 'X1' of the body 204. The intermediate portion 232 may have a constant thickness (measured between the first side 208 and the second side 212 of the body 204) throughout a length of the intermediate portion 232.

The first surface 236 is now discussed. The first surface 236 is defined at the leading strap end 224. The first surface 236 is disposed at the first side 208 of the body 204. The first surface 236 is tapered with respect to the linear profile (or the linear axis 'Y1'). As shown in FIG. 4, the first surface 236 is tapered at a first angle 'A1' with respect to the linear profile (or the linear axis 'Y1'). The first angle 'A1' may be in a range of about 5 degrees to about 15 degrees.

The first surface 236 is tapered to be indented into the body 204 to define a first shoulder portion 280 at the first side 208 of the body 204. In the present embodiment, the first shoulder portion 280 may have an arcuate profile defining a concavity 'C3' that faces away from the trailing strap end 228. The (arcuate profiled) first shoulder portion 280 may be configured to limit flexing (via relative rotation) between the retrofittable track link 200 and a succeeding track link (e.g., the succeeding track link 160', as shown in FIG. 2).

The (tapered) first surface 236 is configured to be mated with a trailing strap end of a succeeding track link (e.g., with the trailing strap end 176' of the succeeding track link 160) at a first overlapping portion 284 of the retrofittable track link 200 with the succeeding track link (as shown in FIG. 2). In operation, the first shoulder portion 280 may limit flexing (via relative rotation) between the leading strap end 224 of the retrofittable track link 200 and the trailing strap end 176' of the succeeding track link 160' about the pin 148.

The second surface 240 is now discussed. The second surface 240 is defined at the trailing strap end 228. The second surface 240 is disposed at the second side 212 of the body 204. The second surface 240 is tapered with respect to the linear profile (or the linear axis 'Y1'). As shown in FIG. 4, the second surface 240 is tapered at a second angle 'A2' with respect to the linear profile (or the linear axis 'Y1'). The second angle 'A2' may be in a range of about 5 degrees to about 15 degrees. In the present embodiment, as shown in FIGS. 4, the second surface 240 is parallel to the first surface 236.

The second surface 240 is tapered to be indented into the body 204 to define a second shoulder portion 292 at the second side 212 of the body 204. In the present embodiment, the second shoulder portion 292 may have an arcuate profile defining a concavity 'C4' that faces away from the leading strap end 224. The (arcuate profiled) second shoulder portion 292 is configured to limit flexing (via relative rotation) between the retrofittable track link 200 and a preceding track link (e.g., the preceding track link 160", as shown in FIG. 2).

The (tapered) second surface 240 is configured to be mated with a leading strap end of a preceding track link (e.g., with the leading strap end 172" of the preceding track link 160") at a second overlapping portion 296 of the retrofittable track link 200 with the preceding track link (as shown in FIG. 2). In operation, the second shoulder portion 292 may limit flexing (via relative rotation) between the trailing strap end 228 of the retrofittable track link 200 and the leading strap end 172" of the preceding track link 160' about the pin 148".

The third surface 244 is now discussed. The third surface 244 is defined at the leading strap end 224. The third surface 244 is disposed at the second side 212 of the body 204, laterally opposite to the first surface 236. The third surface 244 may extend parallel to the linear profile (or the linear axis 'Y1'). Accordingly, the third surface 244 is in tapered relationship with the first surface 236. In this configuration of the leading strap end 224, the lateral thickness defined between the first surface 236 and the third surface 244 decreases as the leading strap end 224 extends toward the intermediate portion 232 of the body 204 along the linear longitudinal axis 'X1'. In an example, a lateral thickness 'T1' of the leading strap end 224 at the leading apex 264 may lie in a range of about 25-40 millimeters, whereas a lateral thickness 'T2' of the leading strap end 224 at the first shoulder portion 280 may lie in a range of about 20-35 millimeters.

The fourth surface 248 is now discussed. The fourth surface 248 is defined at the trailing strap end 228. The fourth surface 248 is disposed at the first side 208 of the body 204, laterally opposite to the second surface 240. The fourth surface 248 may extend parallel to the linear profile (or the linear axis 'Y1'). Accordingly, the fourth surface 248 is in tapered relationship with the second surface 240. In this configuration of the trailing strap end 228, the lateral thickness defined between the second surface 240 and the fourth surface 248 decreases as the trailing strap end 228 extends toward the intermediate portion 232 of the body 204 along the linear longitudinal axis 'X1'. In an example, a lateral thickness 'T3' of the trailing strap end 228 at the trailing apex 276 may lie in a range of about 25-40 millimeters, whereas a lateral thickness 'T4' of the trailing strap end 228 at the second shoulder portion 292 may lie in a range of about 20-35 millimeters.

The leading track pin bore 252 is now discussed. The leading track pin bore 252 is defined at the leading strap end 224. The leading track pin bore 252 may extend between the first surface 236 and the third surface 244. The leading track pin bore 252 defines a first axis 'Z1'. The first axis 'Z1' is perpendicular to the first surface 236. In an exemplary assembly of the retrofittable track link 200 with the succeeding track link 160' (as shown in FIG. 2), upon mating of the first surface 236 of the retrofittable track link 200 with the trailing strap end 176 of the succeeding track link 160', the leading track pin bore 252 is aligned with a second track pin bore 192' of the succeeding track link 160' for receiving the pin 148.

The trailing track pin bore 256 is now discussed. The trailing track pin bore 256 is defined at the trailing strap end 228. The trailing track pin bore 256 may extend between the second surface 240 and the fourth surface 248. The trailing track pin bore 256 defines a second axis 'Z2'. The second axis 'Z2' is perpendicular to the second surface 240. In an exemplary assembly of the retrofittable track link 200 with the preceding track link 160" (as shown in FIG. 2), upon mating of the second surface 240 of the retrofittable track link 200 with the leading strap end 172" of the preceding track link 160", trailing track pin bore 256 is aligned with a first track pin bore 188" of the preceding track link 160" for receiving the pin 148".

INDUSTRIAL APPLICABILITY

An exemplary method of retrofitting a track chain (e.g., the first track chain 140) of an existing endless crawler track (e.g., the endless crawler track 120) with the retrofittable track link 200 is now discussed. The method is discussed in conjunction with FIGS. 2, 3, and 4. Initially, the worn or damaged track link 160 from the first track chain 140 is removed. Next, the retrofittable track link 200 is coupled with the succeeding track link 160' of the first track chain 140. For that, the first surface 236 of the leading strap end 224 (of the retrofittable track link 200) is mated with the trailing strap end 176' of the succeeding track link 160' at the first overlapping portion 284 of the retrofittable track link 200 with the succeeding track link 160'. The first surface 236 is mated with the trailing strap end 176' in a manner to align the leading track pin bore 252 of the retrofittable track link 200 with the second track pin bore 192' of the succeeding track link 160'. Once the leading track pin bore 252 and the second track pin bore 192' are aligned to one another, the pin 148' is allowed to pass therethrough to couple the retrofittable track link 200 with the succeeding track link 160.

Subsequently, the retrofittable track link 200 is coupled with the preceding track link 160" of the first track chain 140. For that, the second surface 240 of the trailing strap end 228 (of the retrofittable track link 200) is mated with the leading strap end 172" of the preceding track link 160" at the second overlapping portion 296 of the retrofittable track link 200 with the preceding track link 160". The second surface 240 is mated with the leading strap end 172 in a manner to align the trailing track pin bore 256 of the retrofittable track link 200 with the first track pin bore 188" of the preceding track link 160". Once the trailing track pin bore 256 and the first track pin bore 188" are aligned to one another, the pin 148" is allowed to pass therethrough to couple the retrofittable track link 200 with the preceding track link 160.

Figure 5:
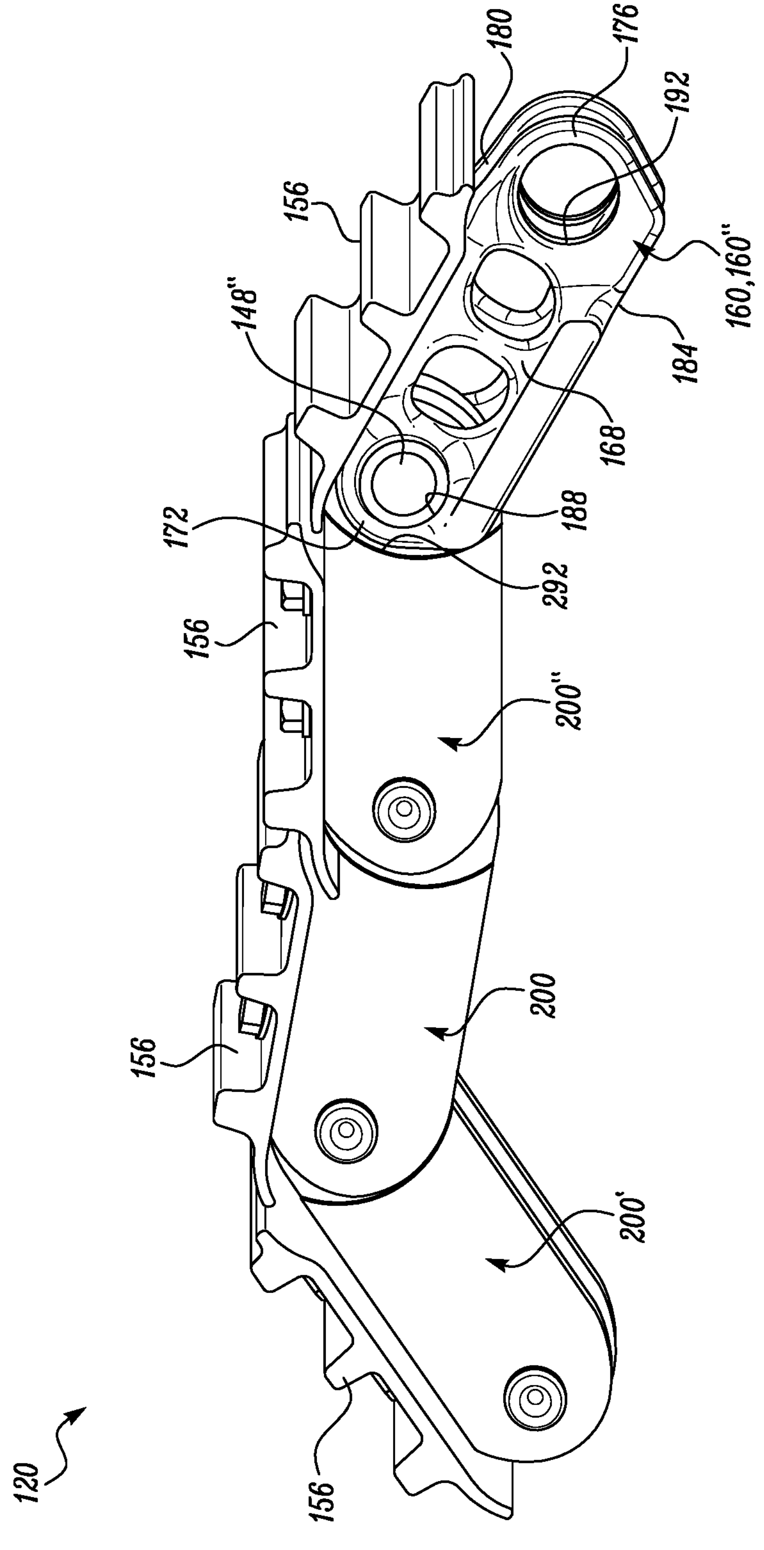
FIG. 5 illustrates flexing between the retrofittable track link and a conventional track link of the endless crawler track, in accordance with an embodiment of the present disclosure.
Figure 6:
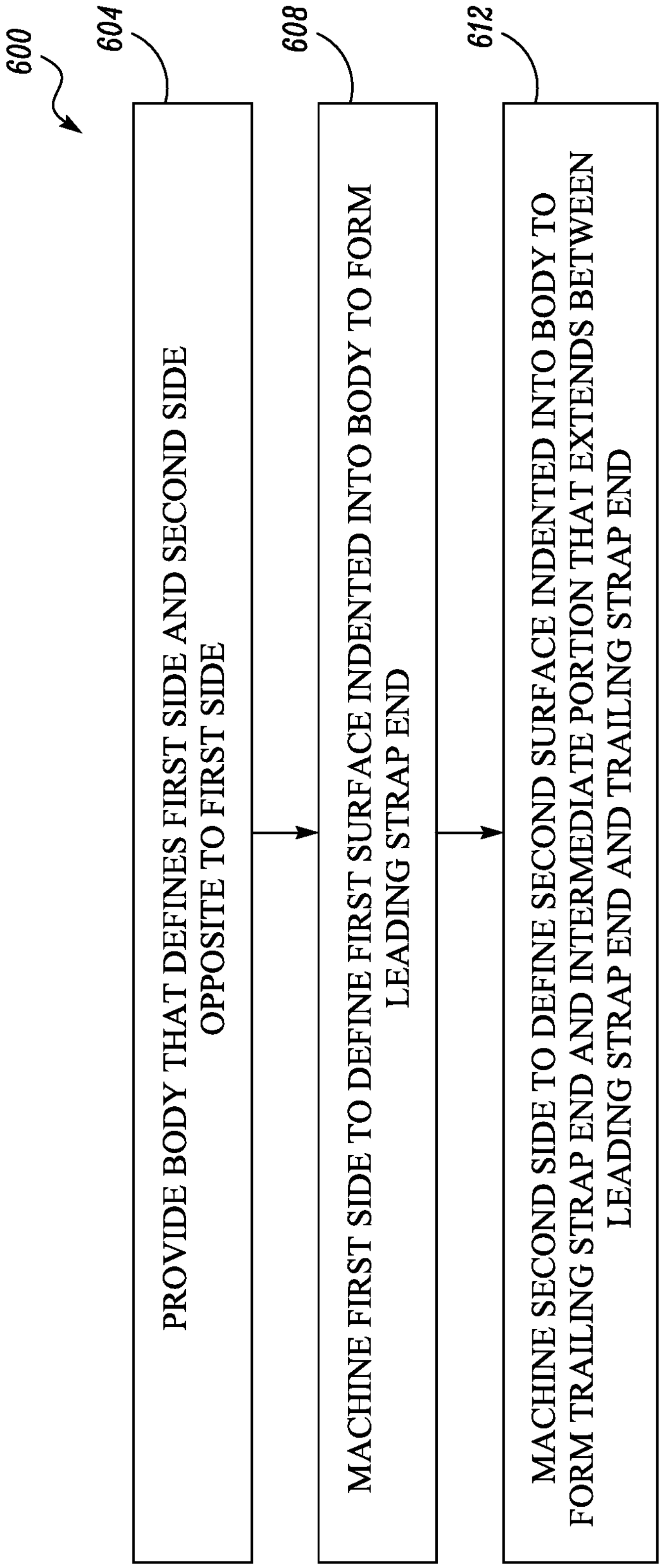
FIG. 6 depicts a flowchart illustrating a method of manufacturing the retrofittable track link for the endless crawler track, in accordance with an embodiment of the present disclosure.

It should be understood that the retrofittable track link 200 may be coupled to another retrofittable track link in the same manner as discussed above. For example, as shown in FIG. 5, the retrofittable track link 200 is coupled with a succeeding retrofittable track link 200' and a preceding retrofittable track link 200".

An exemplary method of manufacturing the retrofittable track link 200 is now discussed. The method is discussed by way of a flowchart 600 that illustrates exemplary steps (i.e., from 604 to 612) associated with the method. Initially, the body 204, in the form of a flat metallic plate, is provided (STEP 604). The body 204 defines substantially planar sides, namely, the first side 208 and the second side 212 laterally opposite to the first side 208. The body 204 may have a thickness substantially the same as a desired thickness of the retrofittable track link 200. In addition, the body 204 may define the upper rail surface 216 and the lower shoe-mounting surface 220 opposite to the upper rail surface 216.

Next, the first side 208 of the body 204 is machined to define the first surface 236 indented into the body 204 and form the leading strap end 224 of the body 204 (STEP 608). The first side 208 of the body 204 may be machined by using a laser cutting technique. Similarly, the second side 212 of the body 204 is machined to define the second surface 240 indented into the body 204 and form the trailing strap end 228 of the body 204 and the intermediate portion 232 extending between the leading strap end 224 and the trailing strap end 228 (STEP 612). The second side 212 of the body 204 may be machined by using a laser cutting technique.

Additionally, the leading strap end 224 of the body 204 may be machined to form the leading track pin bore 252 and the trailing strap end 228 of the body 204 may be machined to form the trailing track pin bore 256. Furthermore, a portion of the leading strap end 224 may be machined to define the first arcuate surface 260 extending between the upper rail surface 216 and the lower shoe-mounting surface 220. In addition, a portion of the trailing strap end 228 may be machined to define the second arcuate surface 272 extending between the upper rail surface 216 and the lower shoe-mounting surface 220.

The retrofittable track link 200 may be used in any track-type machine, such as, for example, tractors, dozers, and other excavating and/or material handling machines. As discussed above, the retrofittable track link 200 is devoid of any complex geometric features, such as complex contours, protrusions, recesses, and the like. Because of simple construction, the retrofittable track link 200 can be retrofittable to any track chain (i.e., inner-side track chain or outer-side track chain) located at either side of the endless crawler track 120. This may eliminate a need to manufacture track links of two different configurations, i.e., left-handed or right-handed track links for the inner-side track chain and the outer-side track chain, respectively, of the endless crawler track 120. As a result, the total number of production parts, processes, and the total number of service replacement parts that needs to be stored for aftermarket, may be reduced. Further, the retrofittable track link 200 can be easily and quickly manufactured using simple and low-cost machining processes (for example, via laser cutting). By eliminating the requirement of expensive manufacturing processes, such as forging or forming, the retrofittable track link 200 may provide a lower cost, higher performance undercarriage assemblies.

Unless explicitly excluded, the use of the singular to describe a component, structure, or operation does not exclude the use of plural such components, structures, or operations or their equivalents. The use of the terms “a” and “an” and “the” and “at least one” or the term “one or more,” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B” or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word “or” refers to any possible permutation of a set of items. For example, the phrase “A, B, or C” refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the retrofittable track link and/or the method of the present disclosure without departing from the scope of the disclosure. Other embodiments will be apparent to those skilled in the art from consideration of the specification and practice of the retrofittable track link and/or the method disclosed herein. It is intended that the specification and examples be considered as exemplary only, with a true scope of the disclosure being indicated by the following claims and their equivalent.

What is claimed is:

1. A retrofittable track link for an endless crawler track, the retrofittable track link comprising:
- a single, monolithic body defining a first side and a second side opposite to the first side,
- a leading strap end, a trailing strap end, and an intermediate portion of the body, the intermediate portion extending between the leading strap end and the trailing strap end, the intermediate portion defining a linear profile, a leading track pin bore of the body at the leading strap end;
- a trailing track pin bore of the body at the trailing strap end;
- a first surface at the leading strap end and a second surface at the trailing strap end, wherein
- the first surface being disposed at the first side and the second surface being disposed at the second side,
- the first surface and the second surface being tapered with respect to the linear profile to be indented into the body,
- the first surface is configured to be mated with a trailing strap end of a succeeding track link of the endless crawler track at a first overlapping portion of the retrofittable track link with the succeeding track link, and
- the second surface is configured to be mated with a leading strap end of a preceding track link of the endless crawler track at a second overlapping portion of the retrofittable track link with the preceding track link.

2. The retrofittable track link as claimed in claim 1,
- the leading track pin bore defining a first axis; and
- the trailing track pin bore defining a second axis, wherein
- the first axis and the second axis being perpendicular to the corresponding first surface and the second surface of the retrofittable track link.

3. The retrofittable track link as claimed in claim 1, wherein the first surface and the second surface are parallel to each other.

4. A retrofittable track link for an endless crawler track, the retrofittable track link comprising:
- a body defining a first side and a second side opposite to the first side,
- a leading strap end, a trailing strap end, and an intermediate portion extending therebetween, the intermediate portion defining a linear profile,
- a first surface at the leading strap end and a second surface at the trailing strap end, wherein
- the first surface being disposed at the first side and the second surface being disposed at the second side,
- the first surface and the second surface being tapered with respect to the linear profile to be indented into the body,
- the first surface is configured to be mated with a trailing strap end of a succeeding track link of the endless crawler track at a first overlapping portion of the retrofittable track link with the succeeding track link
- the second surface is configured to be mated with a leading strap end of a preceding track link of the endless crawler track at a second overlapping portion of the retrofittable track link with the preceding track link, and
- wherein the first surface is tapered at a first angle with respect to the linear profile and the second surface is tapered at a second angle with respect to the linear profile, and wherein each of the first angle and the second angle is in a range of about 5 degrees to about 15 degrees.

5. The retrofittable track link as claimed in claim 1, wherein the body defines:
- a third surface at the leading strap end and a fourth surface at the trailing strap end, wherein
- the third surface being disposed at the second side and the fourth surface being disposed at the first side, and
- the third surface and the fourth surface are parallel to the linear profile.

6. An endless crawler track, comprising:
- a first track chain and a second track chain, each of the first track chain and the second track chain including a plurality of track links serially arranged one after the other such that a leading strap end of a preceding track link overlaps a trailing strap end of a succeeding track link to define a plurality of overlapping portions in a corresponding track chain; and
- a plurality of pins correspondingly passing through the plurality of overlapping portions of each of the first track chain and the second track chain to rotatably and correspondingly couple the plurality of pins with each of the first track chain and the second track chain,
- wherein at least one track link of the plurality of track links comprises the retrofittable track link as claimed in claim 1.

7. The endless crawler track of claim 1 wherein the leading track pin bore opens to the first surface; and
- the trailing track pin bore opens to the second surface.

8. A method of manufacturing a retrofittable track link for an endless crawler track, the method comprising:
- providing a single, monolithic body defining a first side and a second side opposite to the first side;
- machining the first side to define a first surface indented into the body to form a leading strap end of the body;
- machining the second side to define a second surface indented into the body to form a trailing strap end of the body and an intermediate portion extending between the leading strap end and the trailing strap end,
- machining the leading strap end to form a leading track pin bore; and machining the trailing strap end to form a trailing track pin bore, wherein the intermediate portion defines a linear profile, the first side being machined at a first angle with respect to the linear profile to define the first surface and the second side being machined at a second angle with respect to the linear profile to define the second surface, the first surface is configured to be mated with a trailing strap end of a succeeding track link of the endless crawler track at a first overlapping portion of the retrofittable track link with the succeeding track link, and the second surface is configured to be mated with a leading strap end of a preceding track link of the endless crawler track at a second overlapping portion of the retrofittable track link with the preceding track link.

9. The method as claimed in claim 8, wherein each of the first angle and the second angle is in a range of about 5 degrees to about 15 degrees.

10. The method as claimed in claim 8 wherein the leading track pin bore defines a first axis;

wherein the trailing track pin bore defines a second axis; and the first axis of the leading track pin bore and the second axis of the trailing track pin bore are perpendicular to the corresponding first surface and the second surface of the retrofittable track link.

11. The method as claimed in claim 10, wherein the body defines an upper rail surface and a lower shoe-mounting surface opposite to the upper rail surface, the method further including:

machining a portion of the leading strap end to define a first arcuate surface extending between the upper rail surface and the lower shoe-mounting surface; and machining a portion of the trailing strap end to define a second arcuate surface extending between the upper rail surface and the lower shoe-mounting surface.

* * * * *